(12) United States Patent
Yeh

(10) Patent No.: US 7,976,933 B2
(45) Date of Patent: Jul. 12, 2011

(54) SPORTS MAT

(76) Inventor: Tzong In Yeh, Fremont, CA (US)

(*) Notice: Subject to any disclaimer, the term of this patent is extended or adjusted under 35 U.S.C. 154(b) by 509 days.

(21) Appl. No.: 12/222,470

(22) Filed: Aug. 11, 2008

(65) Prior Publication Data
US 2008/0305304 A1 Dec. 11, 2008

Related U.S. Application Data

(63) Continuation-in-part of application No. 11/653,208, filed on Jan. 16, 2007, now abandoned.

(51) Int. Cl.
*B32B 3/00* (2006.01)
*B32B 3/12* (2006.01)
*B32B 3/26* (2006.01)
*B32B 7/14* (2006.01)
*A47G 9/06* (2006.01)

(52) U.S. Cl. ........ 428/159; 428/158; 428/156; 428/203; 428/204; 428/304.4; 428/316.6; 428/315.9; 5/417; 5/420

(58) Field of Classification Search ............ 428/156, 428/158, 159, 187, 203, 204, 304.4, 316.6, 428/318.4, 315.9; 5/417, 420; 482/23; 15/215; 4/581, 582
See application file for complete search history.

(56) References Cited

U.S. PATENT DOCUMENTS

| 3,016,317 | A | | 1/1962 | Brunner |
| 4,147,828 | A | | 4/1979 | Heckel et al. |
| 4,574,101 | A | * | 3/1986 | Tricca et al. .................. 428/138 |
| 4,603,852 | A | * | 8/1986 | Breitscheidel et al. ......... 482/23 |
| 5,562,573 | A | * | 10/1996 | Harinishi ........................ 482/23 |
| 2004/0250346 | A1 | | 12/2004 | Vasishth |
| 2007/0020449 | A1 | | 1/2007 | Hing |

FOREIGN PATENT DOCUMENTS

| DE | 2540036 A | 3/1997 |
| JP | 11266995 A | 10/1999 |
| TW | M251621 | 12/2004 |

* cited by examiner

Primary Examiner — David R Sample
Assistant Examiner — Catherine Simone
(74) Attorney, Agent, or Firm — Rosenberg, Klein & Lee

(57) ABSTRACT

A sports mat includes a first foam layer, a second foam layer laminated on the first foam layer and a patterned laminate bonded on the second foam layer. The first and second foam layers are both made of polyethylene foam containing material of elastic resin and have a density in the range of 2 to 8 pcf and a total thickness in the range of 2 to 8 mm. In addition, the first foam layer is embossed therebottom with a plurality of elongated ridges parallel to one another. The patterned laminate includes a first plastic film laminated to the second foam layer, a second plastic film laminated to the first plastic film, and a pattern placed in between the first and second plastic films and visible through the second plastic film. Additionally, the pattern laminate together with the second foam layer is embossed to define a plurality of concaves in an exterior surface thereof.

3 Claims, 3 Drawing Sheets

SPORTS MAT

CROSS REFERENCE TO RELATED APPLICATION

This is a continuation-in-part of application Ser. No. 11/653,208, filed on Jan. 16, 2007 now abandoned.

BACKGROUND OF INVENTION

1. Field of Invention

The present invention relates to a sports mat and in particular to a yoga mat.

2. Related Prior Art

Recently, exercise has gained popularity among people. Many people go to gyms for exercise. Accordingly, it is necessary to choose a safe and comfortable sports mat. The sports mat protects a user's body from getting hurt while performing an exercise, such as Yoga, Pilates, push up or sit-up.

U.S. Patent Application No. 2004/0250346 discloses a skid-proof multi-layer yoga mat which includes an upper fabric layer, a lower pliable foam layer, and an intermediate adhesive such that during use the mat provides the athlete with safety and comfort and during transport or storage the rolled-up mat provides convenience.

However, the conventional sports mat is dull. This can't satisfy customers' desire for beauty. Nevertheless, the manufacturing process of the mats includes a plurality of steps, such as twisting, plunging and the like. The different colors of materials may be mixed up during the process so that a fresh colorful mat is still needed.

Hence, Taiwan Patent M251621, for example, discloses a yoga mat to enhance visual effects. The yoga mat comprises two transparent layers and a partly colored meshed laminate disposed between the two transparent layers. The colors of the laminate are visible through the transparent layers. The visual effects are improved but to a limited extent.

What is desired, therefore, is a safe, comfortable and beautiful sports mat, which helps the athlete to enjoy exercising with a nice feeling.

SUMMARY OF INVENTION

It is an object of the present invention to provide a sports mat of controlled resilience and beautiful appearance. It is also an object of the present invention to provide a sports mat which possesses great flexibility and can be rolled up easily when the same is to be stored.

It is still another object of the present invention to provide a sports mat of great grip and skid resistance, and combined with good shock absorption.

With the above and other objects in view, the present invention mainly consists in a sports mat, comprising a first foam layer, a second foam layer laminated to the first foam layer and a patterned laminate disposed on the second foam layer. The first and second foam layers are both made of polyethylene foam with a density in the range of 2 to 8 pcf. In particular, the second foam layer further contains material of elastic resin so as to enhance resilience. In addition, the first foam layer is embossed therebottom with a plurality of elongated ridges parallel to one another. The total thickness of the first and second foam layers is in the range of 2 to 8 mm. The patterned laminate is laminated to the second foam layer and includes a first plastic film joined to the second foam layer, a second plastic film laminated to the first plastic film, and a pattern placed in between the first and second plastic films and visible through the second plastic film. Additionally, the pattern laminate together with the second foam layer is embossed to define a plurality of concaves in an exterior surface thereof.

Further benefits and advantages of the present invention will become clear as the description proceeds.

BRIEF DESCRIPTION OF DRAWINGS

The invention will now be elucidated by reference to the following description and accompanying drawings where.

DETAILED DESCRIPTION OF PREFERRED EMBODIMENT

With reference to FIGS. 1 to 4, description will be given of a sports mat according to the preferred embodiment of this invention.

Figure 1:
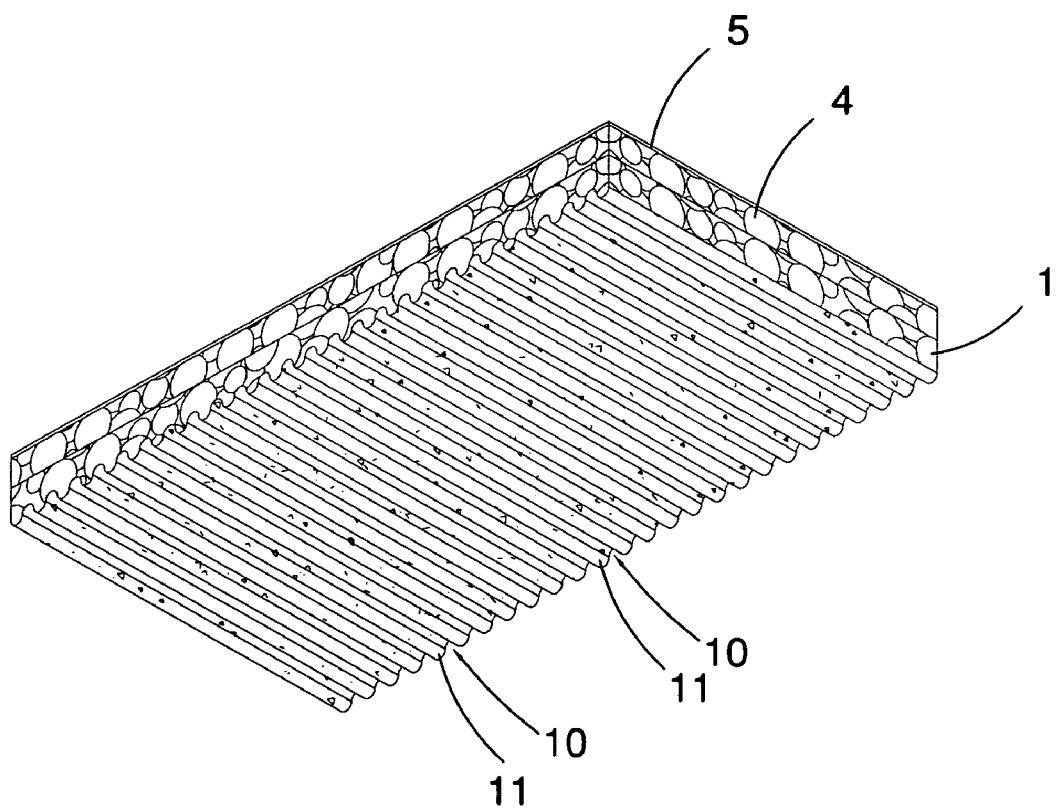
FIG. 1 is a perspective view of a sports mat according to the preferred embodiment of the present invention.
Figure 2:
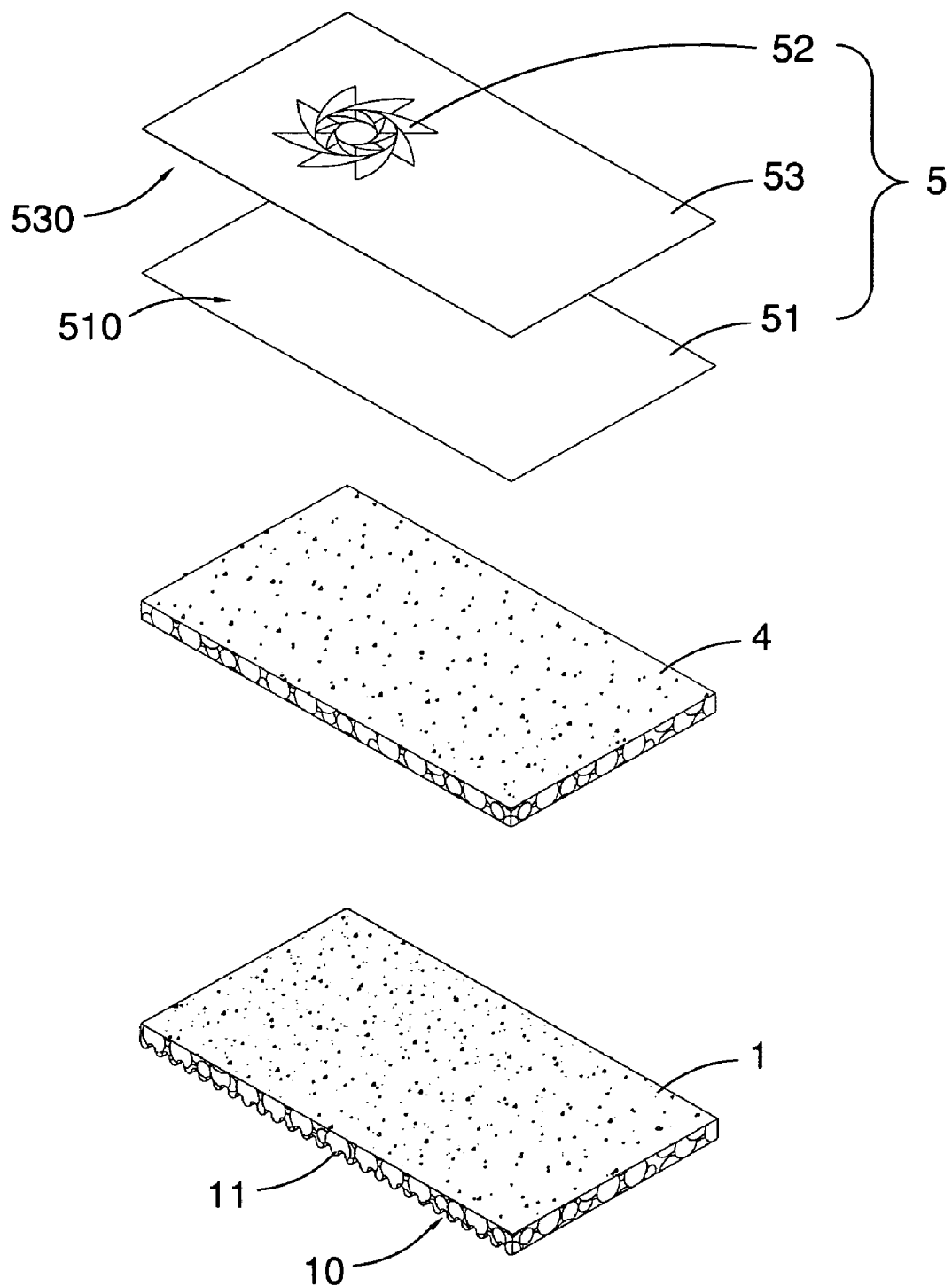
FIG. 2 is an exploded view of the sports mat of FIG. 1.

Referring first to FIGS. 1 and 2, the sports mat comprises a first foam layer 1, a second foam layer 4 laminated on a top of the first foam layer 1 and a patterned laminate 5 laminated on a top of the second foam layer 4.

The sports mat, when in use, is placed on the floor or the like with the first foam layer 1 contacting the floor so that the person carrying out exercises will come in contact with the patterned laminate 5.

Figure 3:
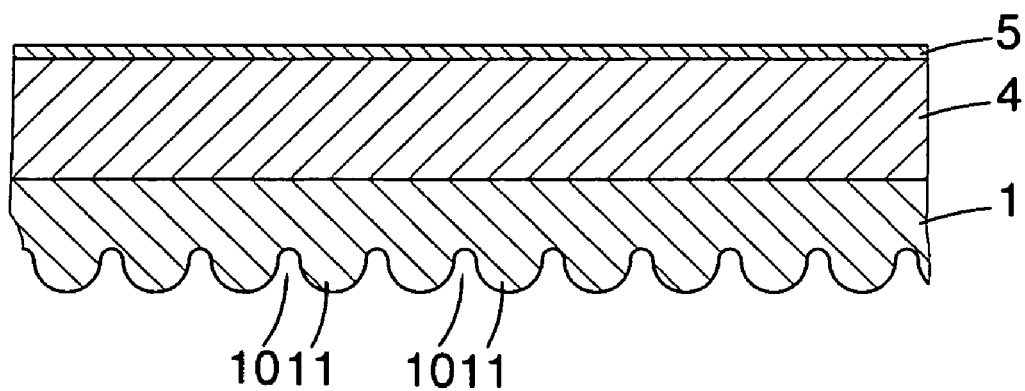
FIG. 3 is a cross-sectional view of the sports mat of FIG. 1.

As can be seen in FIGS. 2 and 3, the first foam layer 1 is embossed therebottom with a plurality of elongated ridges 11 separated from one another by valleys 10. Those elongated ridges 11 are parallel to one another and preferably are arch-shaped.

The first and second foam layers 1, 4 are both made of polyethylene foam containing an additive of elastic resin. The elastic resin helps to enhance the resilience of the sports mat. Both of the first and second foam layers 1, 4 have a density in the range of 2 to 8 pcf and a total thickness in the range of 2 to 8 mm. Preferably, the density of the foam layers is 4 pcf and the total thickness is 4 mm in order to have the sports mat possess tenderness and great flexibility.

Since the first and second foam layers 1, 4 are generally made of the same materials so that the second foam layer 4 may be directly bonded to the first foam layer 1 via a heat lamination process without an adhesive or an intermediate layer therebetween.

The patterned laminate 5 includes a first plastic film 51, a pattern 52 and a second plastic film 53. The first plastic film 51 is made of polyethylene or the like, so that it can also be directly heat-laminated on the second foam layer 4. Preferably, the first plastic film 51 has a thickness in the range of 0.01 to 0.07 mm, and especially 0.015 mm. The second plastic film 53 is also made of polyethylene and is laminated to the first plastic film 51. The thickness of the second plastic film 52 is preferably 0.0115~0.1 mm and more preferably 0.03 mm. The second plastic film 53 is especially transparent or half-transparent so that the pattern 52 printed on either an outer surface 510 of the first plastic film 51 or an inner surface 530 of the second film 53 became visible through the second plastic film 53. As such, the pattern 52 can also be protected from color fading as a result of the first and second films 51 and 53. In addition, the pattern 52 made of chemical compositions is isolated from a user's skin, so that it is safe to a user.

Preferably, the first foam layer 1 is dark-colored with respect to the second foam layer 4. That is, the first foam layer 1 may be darker than the second foam layer 4. The second foam layer 4 is light-colored in order to serve as a background of the pattern 52 of the patterned laminate 5. As such, a variety of colorful patterns with designs or marks, provided on the sports mat, become more vivid with respect to the light-colored background, namely the second foam layer 4.

For anti-slippery purpose, the top of the sports mat, namely the patterned laminate 5 together with the second foam layer 4 may be embossed with irregular patterns to define a plurality of concaves (not shown) in an exterior surface thereof. The embossed patterns or concaves can be lines, dots and the like, so as to prevent the athlete or user from slipping and tumbling.

Figure 4:
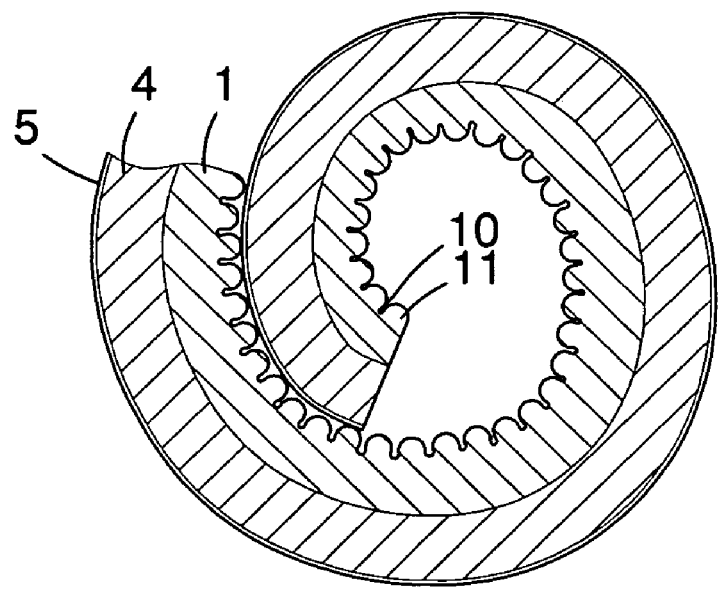
FIG. 4 is a perspective view of the sports mat, showing that the sports mat is rolled up.

As can be seen in FIG. 3, on the bottom of the sports mat is the first foaming layer 1 embossed with the valleys 10 and the elongated ridges 11 parallel with an axis about which the sports mat can be rolled. Thus, as depicted in FIG. 4, when the sports mat is rolled up, the first foam layer 1 provides rooms, namely the valleys 10, for wresting so that the sports mat won't become shrunk. Accordingly, the sports mat can be rolled up easily due to the elongated ridges 11 and the valleys 10. Moreover, due to the profiling of the elongated ridges 11 and the valleys 10, the sports mat possesses extraordinary flexibility and provides great grip and skid resistance, and combined with good shock absorption. Preferably, each of the ridges is arch-shaped in cross section.

In practice, the depth of the valleys 10 is preferably about 0.25 to 2 mm, and the interval between two adjacent valleys 10 is preferably 3 mm. Although the total thickness of the first and the second foam layers 1, 4 is preferably in the range of 2 to 8 mm, the thickness of the first foam layer 1 is not necessary to be the same with that of the second foam layer 4.

As stated above, the sports mat of the present invention satisfies the desire of beauty as well as the needs of comfort, safety and high elasticity.

Numerous characteristics and advantages of the invention have been set forth in the foregoing description. The disclosure, however, is illustrative only, and changes may be made in detail within the principle of the invention, to the full extent indicated by the broad general meaning of the terms in which the appended claims are expressed.

The invention claimed is:

1. A sports mat comprising:
   a first foam layer formed therebottom with a plurality of elongated ridges parallel to one another;
   a second foam layer laminated to a top of said first foam layer, wherein said first and second foam layers are both made of polyethylene foam containing an additive of elastic resin and have a density in the range of 2 to 8 pcf and a total thickness in the range of 2 to 8 mm; and
   a patterned laminate bonded to a top of said second foam layer and comprising a first plastic film laminated to said second foam layer, a second plastic film laminated to said first plastic film, and a pattern placed in between said first and second plastic films and visible through said second plastic film;
   wherein said pattern laminate together with said second foam layer is embossed to define a plurality of concaves in an exterior surface thereof.

2. The sports mat of claim 1 wherein each of said elongated ridges is arch-shaped in cross section.

3. The sports mat of claim 2 wherein said first foam layer is dark-colored with respect to said second foam layer.

\* \* \* \* \*